United States Patent
Perez et al.

(10) Patent No.: US 10,690,386 B2
(45) Date of Patent: Jun. 23, 2020

(54) CONTROLLING METERING DEVICES

(75) Inventors: Eric Perez, Hickory Creek, TX (US); Shawn Niemann, Grand Prairie, TX (US); Colin Clara, Addison, TX (US); Der-Kai Hung, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 1332 days.

(21) Appl. No.: 13/600,685

(22) Filed: Aug. 31, 2012

(65) Prior Publication Data
US 2014/0020410 A1   Jan. 23, 2014

Related U.S. Application Data

(60) Provisional application No. 61/673,804, filed on Jul. 20, 2012.

(51) Int. Cl.
*F25B 41/06* (2006.01)

(52) U.S. Cl.
CPC .... *F25B 41/062* (2013.01); *F25B 2341/0681* (2013.01); *F25B 2600/2513* (2013.01)

(58) Field of Classification Search
CPC ............ F25B 2341/0681; F25B 41/062; F25B 2600/2513
See application file for complete search history.

(56) References Cited

U.S. PATENT DOCUMENTS

| | | | | |
|---|---|---|---|---|
| 4,432,492 A * | 2/1984 | Kunz | ...................... | F25B 41/06 236/92 B |
| 4,879,879 A * | 11/1989 | Marsala | .................. | F25B 21/04 236/68 B |
| 5,188,286 A * | 2/1993 | Pence, IV | ........ | G05D 23/27535 236/1 F |
| 5,195,331 A * | 3/1993 | Zimmern et al. | ................ | 62/202 |
| 5,941,086 A * | 8/1999 | Petrulio | ................ | F25B 41/062 236/68 R |
| 6,102,113 A * | 8/2000 | Cowans | .................. | B23Q 11/10 165/104.33 |
| 2002/0194864 A1* | 12/2002 | Hirota | ................... | F25B 41/062 62/498 |
| 2010/0300126 A1* | 12/2010 | Gassen | ................... | F25B 9/008 62/115 |
| 2012/0167602 A1* | 7/2012 | Taras et al. | ..................... | 62/115 |

* cited by examiner

*Primary Examiner* — David J Teitelbaum
(74) *Attorney, Agent, or Firm* — Baker Botts L.L.P.

(57) ABSTRACT

A metering device may automatically control fluid flow through a valve. A control system may alter the automatic control of a metering device. In some implementations, a predetermined event may occur to alter the automatic control of the metering device.

6 Claims, 3 Drawing Sheets

CONTROLLING METERING DEVICES

CROSS-REFERENCE TO RELATED APPLICATIONS

This application claims priority to U.S. Provisional Patent Application No. 61/673,804, entitled "CONTROLLING AIR CONDITIONERS AND METERING DEVICES" filed on Jul. 20, 2012, which is incorporated by reference herein for all purposes.

TECHNICAL FIELD

The present disclosure relates to metering devices, and more particularly to controlling metering devices.

BACKGROUND

Metering devices, such as thermal expansion valves, are often used to control the flow in a system. For example, a thermal expansion valve may include a bulb that is positioned in a system, and the valve may open and close automatically based on the temperature of the bulb.

SUMMARY

In various implementations, an air conditioner may include a thermal expansion valve and a control system. The thermal expansion valve may automatically adjust an amount of refrigerant allowed to pass through the valve. The thermal expansion valve may include a bulb and a temperature of the bulb may at least partially control an amount of refrigerant allowed to pass through the thermal expansion valve. The control system may be coupled to the thermal expansion valve. The control system may include one or more heat transfer elements to alter the temperature of the bulb. The control system may include a controller coupled to one or more of the heat transfer elements. The controller may deliver a signal controlling the heat transfer by one or more of the heat transfer elements. The control system may be configured to alter the automatic adjustment of the thermal expansion valve in response to a predetermined event.

Implementations may include one or more of the following features. At least one of the heat transfer elements may include a resistor. The air conditioner may include a microchannel heat exchanger. The air conditioner may include an evaporator and a suction line coupled to the evaporator. The bulb may be at least partially disposed in the suction line. The controller may deliver a signal in response to detecting a predetermined event. The predetermined event may include an ambient temperature proximate a condenser of the air conditioner exceeding a predetermined maximum temperature and/or a pressure in portion of the air conditioner exceeding a predetermined maximum pressure. The controller may manage operations of the air conditioner.

In various implementations, an air conditioner may be allowed to operate in response to an operation request and an amount of refrigerant allowed to flow through the thermal expansion valve may be at least partially based on a temperature of a bulb of the thermal expansion valve. A determination may be made whether a predetermined event has occurred. The automatic adjustment of the thermal expansion valve may be altered if the predetermined event has occurred. Altering the automatic adjustment may include delivering a signal to one or more of the heat transfer elements, allowing heat transfer between at least one of the heat transfer elements and the bulb to alter the temperature of the valve, and/or adjusting an amount of refrigerant allowed to flow through the thermal expansion valve based at least partially on the altered temperature of the bulb. The signal may control the heat transfer by one or more of the heat transfer elements.

Implementations may include one or more of the following features. The predetermined event may include an ambient temperature exceeds a predetermined maximum temperature and/or a pressure in a portion of the air conditioner exceeds a predetermined maximum pressure. The air conditioner may be allowed to operate in response to an operation request if the predetermined event has not occurred. An additional determination may be made whether the predetermined event is occurring after the amount of refrigerant has been altered.

A request for operation of the air conditioner may be received and the air conditioner may respond to the request for operation, if the additional determination is made that the predetermined event is not occurring. The amount of refrigerant allowed to flow through the thermal expansion valve may be additionally adjusted if the additional determination is made that the predetermined event is occurring. A responsiveness of the thermal expansion valve to the delivered signal may be monitored and the amount of refrigerant allowed to pass through the valve may be additionally adjusted by delivering an additional signal to at least one of the heat transfer elements when the responsiveness of the thermal expansion valve is outside a predetermined tolerance range.

In various implementations, a control system, for a valve controller, may include one or more heat transfer elements and a controller coupled to at least one of the heat transfer elements. The heat transfer element(s) may alter a temperature of a bulb of a valve controller. The bulb may automatically control a valve and altering the temperature of the bulb may alter a degree of openness of the valve. The controller may deliver a signal to at least one of the heat transfer elements in response to a predetermined event. The signal may control heat transfer by one or more of the heat transfer elements.

Implementations may include one or more of the following features. The valve controller may be a thermal expansion valve. At least one of the heat transfer elements may include a resistor. One or more of the heat transfer elements may transfer heat to the bulb and/or remove heat from the bulb. The control system may include a retrofit kit for modifying air conditioners such that operations of the valve controller of the air conditioner may be adjusted using the control system. The retrofit kit may include one or more of the heat transfer elements. The retrofit kit may include the controller.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Metering devices may be used to control a flow of a fluid in a system. Metering devices may include various valves, such as valve controllers (e.g., thermal expansion valves), that automatically control fluid flow based on a determined property of the system. For example, a thermal expansion valve may automatically control a fluid flow to keep a pressure in a system approximately constant, such as a pressure downstream of the valve. The thermal expansion valve may regulate a pressure in a system.

Figure 1:
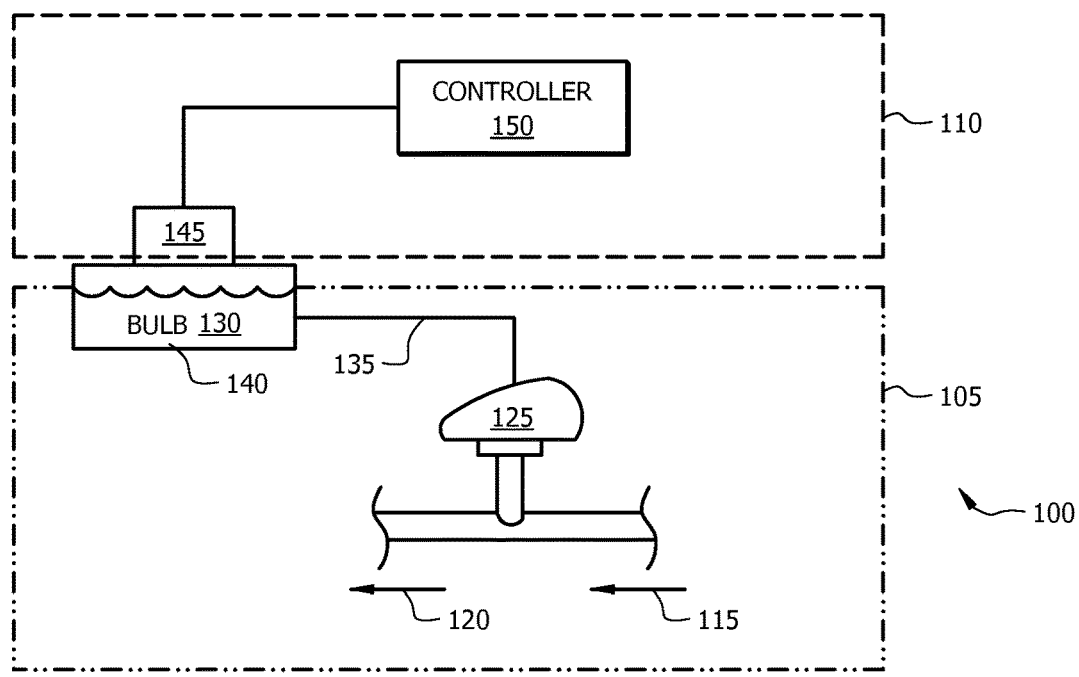
FIG. 1 illustrates an implementation of a portion of a example system including a valve controller.

FIG. 1 illustrates an example of a portion 100 of a system that includes a thermal expansion valve 105, as a metering device, and a control system 110 to adjust the metering device.

The thermal expansion valve or valve 105 may automatically at least partially open to allow fluid entering the valve 115 to pass through the valve and/or at least partially close to restrict fluid entering the valve 115. The openness of the valve 105 may control the amount of fluid that is allowed to pass through the valve 120.

The thermal expansion valve 105 may include a diaphragm 125; and, as the diaphragm expands and contracts, the openness of the thermal expansion valve 105 may be altered. For example, as the diaphragm 125 expands, the openness of the valve 105 may be increased and fluid flow through the valve 120 may be increased. The diaphragm 125 may be coupled to a bulb 130 through a capillary tube 135. In an implementation, the bulb 130 may be partially filled with a liquid 140, such as refrigerant. The bulb 130 may be positioned in at least a portion 100 of the system to maintain a desired property (e.g., temperature and/or pressure) of the system, and thus fluid flow through the valve 120 may be altered to maintain this desired property.

As illustrated in FIG. 1, the control system 110 may be coupled to the bulb 130 of the thermal expansion valve 105. The control system 110 may alter the automatic control of the thermal expansion valve 105 by altering a temperature of the bulb 130.

The control system 110 may include one or more heat transfer elements 145 coupled to the bulb 130 and a controller 150 coupled to the heat transfer element(s). The heat transfer element(s) 145 and/or the controller 150 may include coupling portions (e.g., recessed portions; adhesive portions; and/or portions configured to receive coupling members, such as screws) to facilitate coupling the heat transfer elements and/or the controller to portions of the system.

A heat transfer element 145 may alter a temperature of the bulb 130. For example, the heat transfer elements 145 may generate heat and/or cold, deliver heat to, and/or remove heat from the bulb 130. For example, the bulb may be 50° F. and the heat transfer element 145 may deliver heat to the bulb to raise the temperature of the bulb to 60° F. The automatic operation and adjustments of the thermal expansion valve may then be altered to operate based on the new altered temperature (e.g., 60° F.).

In some implementations, the heat transfer element 145 may be a resistor. In an implementation, the heat transfer element may include a thermistor (e.g., R51 thermistor). In some implementations, a resistor may be combined with a variable input voltage and/or with a variable current, such as in a silicon-controlled rectifier (SCR) which may be utilized to provide a variable amount of heat to the bulb. When a current passes through the resistor, heat may be generated and thus transferred to the bulb.

In some implementations, a heat transfer element may be an active heat sink, such as a Peltier effect device or thermoelectric cooling heat transfer element. When a voltage is applied to a thermocouple of the Peltier effect device, a temperature differential is created between the two sides of the thermocouple and a heat sink may be created and the temperature of the bulb may be decreased. In an implementation, a piezoelectric heat transfer element may be used.

The controller may include various types of controllers, such as pneumatic controllers, electromechanical controllers, solid state controllers, and/or computer systems. In some implementations the controller may be operable on 24 VAC. The controller may be a dedicated controller for the control system 110, a portion of a controller for the system and/or integrated into the controller for the system. The controller 150 may deliver a signal to the heat transfer element 145 so that the heat transfer element alters the temperature of the bulb 130.

In some implementations, a control system may include sensors such as a temperature and/or pressure sensor. The sensor may include a switch. The control system may detect temperature, pressure and/or changes in temperature and/or pressure using the sensors. The control system may detect predetermined events based on the sensors.

Figure 2:
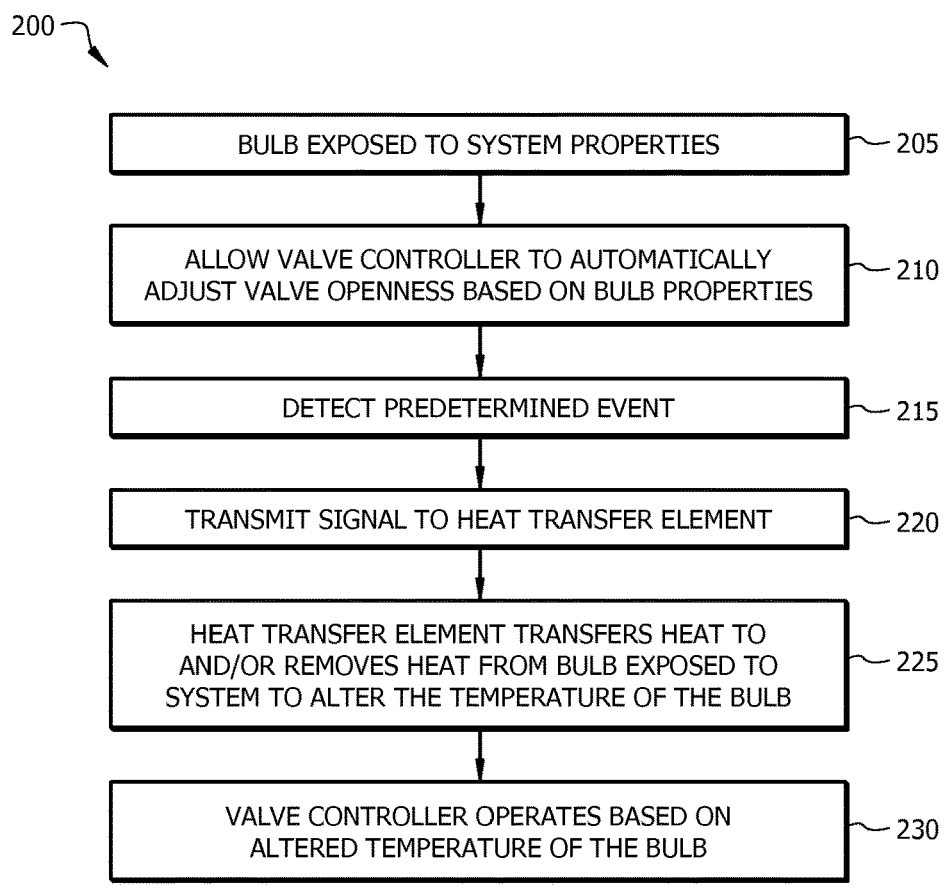
FIG. 2 illustrates an implementation of an example process for operation of a system including a valve controller.

FIG. 2 illustrates an implementation of an example process 200 for altering control of a valve controller, such as the example thermal expansion valve illustrated in FIG. 1. The bulb of the thermal expansion valve is exposed to system properties (operation 205). For example, the bulb may be disposed at least partially in a portion of the system and/or coupled to a portion of the system. The bulb may be designed to monitor properties of the system, such as temperature, pressure and/or fluid velocity.

The openness of the thermal expansion valve may be automatically adjusted based on the bulb properties (operation 210). For example, a pressure of fluid in the bulb may adjust based on the temperature of the portion of the system to which the bulb is exposed. The thermal expansion valve may automatically adjust a position of the valve or the openness of the valve based at least partially on bulb properties. For example, the pressure of fluid in the bulb may cause a diaphragm coupled to the bulb to expand and/or contract and the openness of the valve may be altered based on the expansion and/or contraction of the diaphragm. By automatically adjusting the openness of the valve based on bulb properties, where the bulb properties are based at least partially on exposure to system properties, the system properties may be maintained (e.g., temperatures and/or pressures in portions of the system may be maintained).

The controller may detect a predetermined event (operation 215). For example, the controller may determine a predetermined event occurs when ambient temperatures exceed a predetermined temperature. The controller may determine a predetermined event occurs when a pressure of the system exceeds a predetermined pressure. In some implementations, a predetermined event may include when a valve responsiveness (e.g., to signals to open and/or close the valve) is outside a predetermined tolerance range.

The controller may transmit a signal to a heat transfer element coupled to the controller (operation 220). For example, the controller may determine a predetermined event has occurred and send a signal to the heat transfer element such that heat is transferred to the bulb from the heat transfer element. The controller may determine that a predetermined event has not occurred and the signal to the heat transfer element may indicate that heat is not to be removed or applied to the bulb.

The heat transfer element may transfer heat and/or remove heat from the bulb exposed to the system to alter a temperature of the bulb (operation 225). For example, the heat transfer element may be a resistor coupled to the bulb and when the signal is transmitted to the resistor, heat is transferred to the bulb from the resistor.

The thermal expansion valve may operate based on the altered temperature of the bulb (operation 230). For example, the openness of the valve may be increased in response to a signal (such as when an altered temperature is greater than an initial temperature when the bulb is exposed to system properties) and more fluid may be allowed to pass through the valve.

Process 200 may be implemented by various systems, such as system 100. In addition, various operations may be added, deleted, or modified. For example, the controller may monitor properties of the system and determine whether predetermined events occur based on the monitoring. As another example, the controller may transmit signals to heat transfer elements when a predetermined event is detected and/or may not transmit signals to the heat transfer elements when a predetermined event is not detected. In some implementations, a determination may be made whether the predetermined event has ended. The system may be allowed to return to normal operations (e.g., respond to requests for operation) if the predetermined event has ended. For example, when ambient temperatures are no longer high, the system may be allowed to return to normal operations and the thermal expansion valve may be allowed to automatically adjust the valve openness based on system properties rather than the altered bulb properties.

Thermal expansion valves are used in various systems, such as air conditioning systems. Air conditioners with thermal expansion valves may be more efficient than air conditioners without thermal expansion valves. The thermal expansion valve may control an amount of refrigerant flow and thus superheating at an outlet of evaporator.

Microchannel air conditioners may include thermal expansion valves to regulate refrigerant flow into the evaporator. Microchannel air conditioners may include air conditioners that include: MCHX® heat exchangers commercially available from Delphi (Michigan, USA); Environ™ Coil technology commercially available from Lennox (Texas, USA); and/or Hypercore™ microchannel heat exchanger technology commercially available from Lennox (Texas, USA). Microchannel air conditioners may cost less, use less refrigerant, have smaller footprints when compared to similar output air conditioners without microchannel heat exchangers, and/or assist in meeting and/or exceeding energy efficiency ratios (e.g., EER (energy efficiency ratio and/or SEER (seasonal energy efficiency ratio)). However, microchannel air conditioners may be more sensitive to changes from ideal operating conditions (e.g., incorrect charging, dirty coils, high pressure problems, and/or high ambient temperatures).

A control system for the thermal expansion valve may assist in reducing and/or accommodating sensitivity. The control system may alter the ordinary automatic operation of the thermal expansion valve (e.g., alter openness of a valve in response to system properties detected by a bulb of the valve) to reduce the effect of predetermined conditions that may increase sensitivity (e.g., high pressures in the evaporator due to charging, low pressures in portions of the air conditioner, and/or high ambient temperatures).

Figure 3:
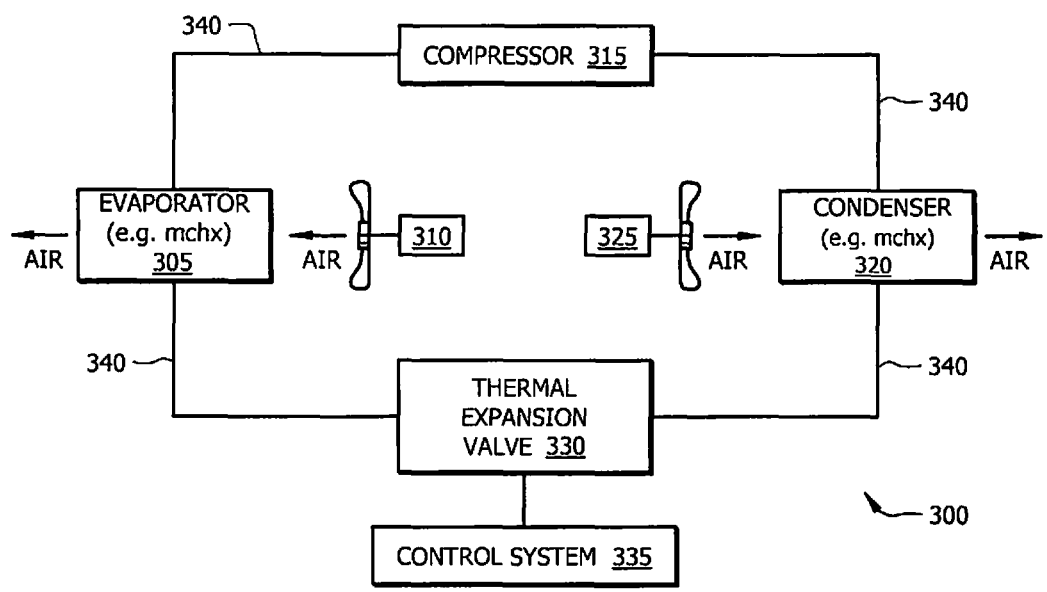
FIG. 3 illustrates an implementation of an example air conditioner.

FIG. 3 illustrates an implementation of an example air conditioner 300. The air conditioner 300 may include components such as an evaporator 305, evaporator fan 310, compressor 315, condenser 320, condenser fan 325, and thermal expansion valve 330, and/or control system 335. Heat exchangers such as evaporator 305 and condenser 320 can comprise microchannel heat exchangers. One or more of the components may be coupled through refrigerant lines 340 (e.g., conduit between components at least partially containing refrigerant during use). During use, the evaporator 305 allows liquid refrigerant to evaporate to form a gaseous fluid flow that is provided to the compressor 315. At least a portion of the air from the evaporator fan 310 may flow at least partially through the evaporator 305 and the cooler air exiting the evaporator may be provided (e.g., via ducting) to a location. The compressor 315 increases the pressure of the gaseous fluid flow and the higher pressure gas is provided to the condenser 320. The condenser 320 allows the gas refrigerant to condense into a liquid. At least a portion of the air from the condenser fan 325 may flow at least partially through the condenser 320 and absorb heat from the refrigerant, which may allow the refrigerant to liquefy. The liquid refrigerant then is allowed to at least partially pass through the thermal expansion valve 330. The thermal expansion valve 330 may allow and/or restrict fluid flow through the valve at least partially based on the automatic adjustment of the thermal expansion valve and/or the control system 335. In some implementations, a bulb of the thermal expansion valve 330 may be positioned proximate the evaporator 305 (e.g., in an refrigerant line exiting the evaporator) and the control system may include a resistor coupled to the bulb.

Although a cooling cycle has been described, the flow may be reversed, in some implementations, to provide a heating cycle. In some implementations, one or more of the various processes may be performed in conjunction with the heating cycle, as appropriate.

Although fans have been described, any appropriate blower may be utilized (e.g., centrifugal fan, cross-flow fan, and/or axial fan).

Figure 4:
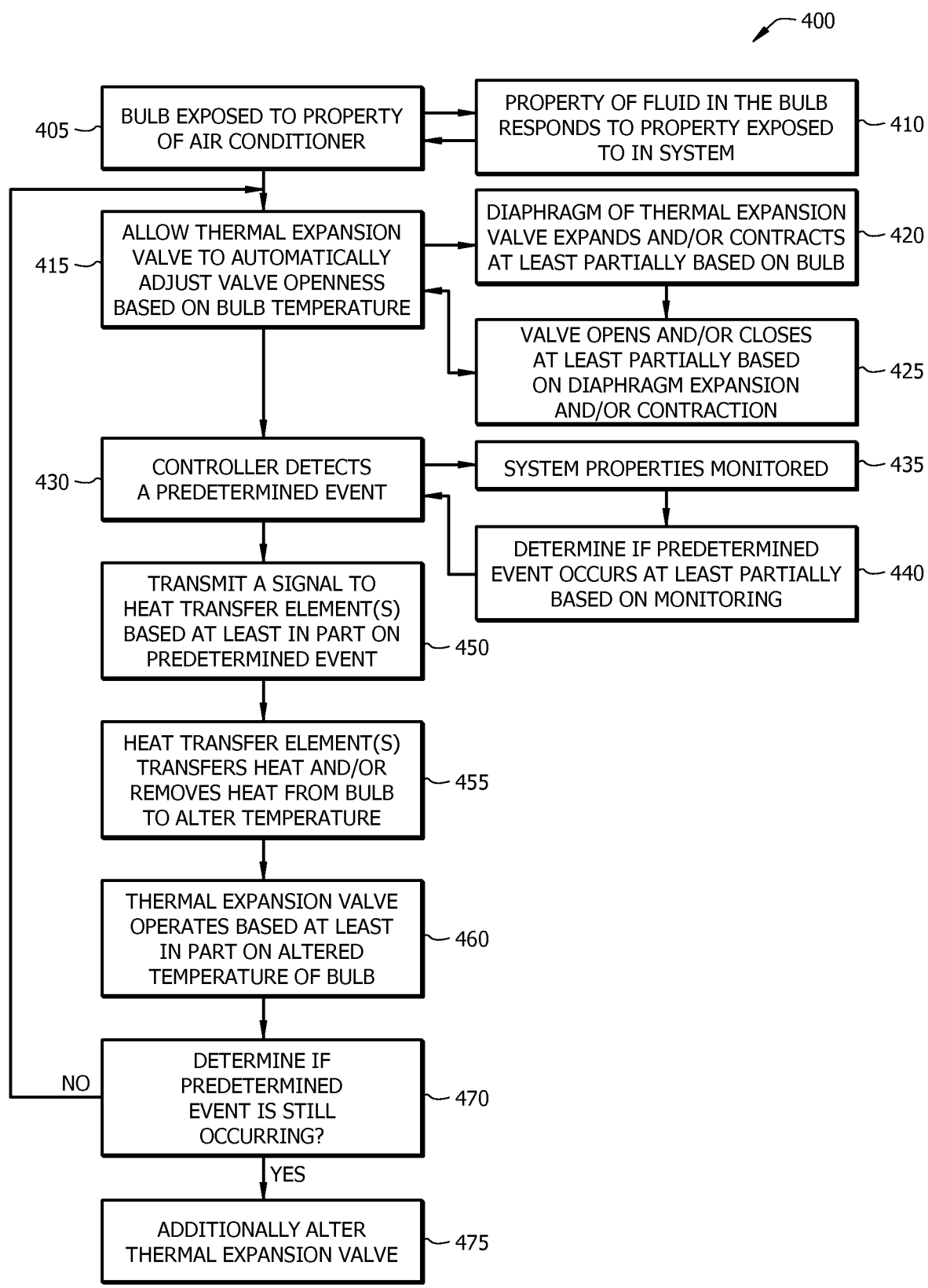
FIG. 4 illustrates an implementation of an example process for controlling an air conditioner.

FIG. 4 illustrates an implementation of an example process 400 of controlling an example air conditioner. A bulb may be exposed to a property of a portion of an air conditioner (operation 405). For example, the bulb may be disposed in a suction line of the evaporator. The bulb may monitor and/or detect properties of the air conditioner such as temperature and/or pressure. For example, the pressure of a fluid in the bulb may respond to changes in the temperature to which the bulb is exposed (operation 410). For example, a fluid may be disposed at least partially in the bulb and properties of the fluid (e.g., temperature, pressure, quantity of vapor, etc.) may depend on the properties of the environment of the bulb. For example, as a temperature increases, an internal pressure of the fluid in the bulb may be increased which acts upon a diaphragm of the thermal expansion valve through a capillary tube.

The thermal expansion valve may automatically control fluid flow through the valve at least partially based on the bulb (operation 415). For example, during use, the thermal expansion valve may automatically control the amount of fluid allowed to pass through the valve based on the pressure of the fluid at least partially disposed in the bulb. A diaphragm of the thermal expansion valve may expand and/or contract at least partially based on the pressure of fluid in the bulb (operation 420). The bulb may be coupled to the diaphragm. The valve may open and/or close at least partially based on the expansion and/or contraction of the diaphragm (operation 425). For example, as the pressure of fluid in a bulb increases, the diaphragm may expand to open the valve.

A controller may detect a predetermined event (operation 430). For example, the controller may determine if various predetermined events have occurred, such as high ambient temperatures proximate a condenser, high pressure in portion(s) of the air conditioner, incorrect charging, and/or responsiveness of a valve is not within a predetermined range.

Properties of the system may be monitored (operation 435). For example, ambient temperature may be monitored. A pressure of a portion of the system may be monitored. A controller may monitor the properties of the system. For example, the controller may be coupled to one or more sensors. The sensors may detect various properties of the system, such as temperature, pressure, fluid velocity, etc.

A determination may be made whether a predetermined event has occurred at least partially based on the monitoring (operation 440). For example, when sensors detect a property, such as temperature, that is not within a predetermined range, a predetermined event may be detected. A determination may be made whether an ambient temperature is greater than a predetermined maximum temperature. A determination may be made whether a pressure of a portion of a system exceeds a predetermined maximum.

A signal may be transmitted to heat transfer element(s) at least partially based on the predetermined event (operation 450). For example, the controller may transmit a signal to allow more fluid to flow through a valve when a high ambient temperature predetermined event has been detected. The signal may be a current delivered to a heat transfer element, such as resistor. The signal may be, in some implementations, a voltage delivered to a heat transfer element that includes a thermocouple.

The heat transfer element may transfer heat to and/or remove heat from the bulb to alter the temperature of the bulb (operation 455). For example, a heat transfer element may include a resistor that is coupled to the bulb. The heat from the resistor, when a current at least partially passes through the resistor, may be transferred to the bulb.

The thermal expansion valve may operate based at least partially on the altered temperature of the bulb (operation 460). For example, the openness of the valve may be at least partially based on the pressure of fluid at least partially disposed in the bulb.

An additional determination may be made whether the predetermined event is still occurring (operation 470). For example, a determination may be made whether ambient temperatures exceed a predetermined maximum temperature. Sensors coupled to the controller may monitor a property of the system and the additional determination may be made based on the monitoring.

The automatic adjustment of the thermal expansion valve may be additionally altered, if the predetermined event is still occurring (operation 475). For example, if ambient temperatures still exceed predetermined maximum temperatures, then an additional signal may be transmitted to the heat transfer element(s). The additional signal may cause the heat transfer element(s) to transfer heat to the bulb and increase the openness of the valve.

If the predetermined event is not still occurring, the thermal expansion valve may be allowed to automatically adjust valve openness (e.g., based on system properties) (operation 415). For example, if a pressure in a portion of a system no longer exceeds a predetermined maximum pressure, then the thermal expansion valve may be allowed to automatically adjust based on properties of the bulb. In some implementations, the signal may be restricted, terminated, and/or altered by the controller such that the heat transfer elements are restricted from transferring heat to and/or removing heat from the bulb.

Process 400 may be implemented by various systems, such as systems 100 and 300. In addition, various operations may be added, deleted, or modified. For example, the pressure in the bulb may respond to pressure of a portion of the system in addition to and/or rather than temperature.

In some implementations, the control system for the thermal expansion valve may be a retrofit kit for air conditioners. For example, an air conditioner may be installed at a location and may be operating. In an implementation, a greater operational efficiency, greater ability to operate during high ambient temperatures (e.g., greater than 116° F.), and/or increased ability for the air conditioner to handle high pressure events may be achieved though installation of the retrofit kit.

A retrofit kit may include one or more heat transfer elements. The retrofit kit may include a controller installable on the air conditioner. In some implementations, the retrofit kit may include a software update for a controller of an air conditioner such that control of the heat elements may be achieved. The retrofit kit may include sensors, such as temperature and/or pressure switches.

During installation of the retrofit kit, at least one heat transfer element may be coupled to the bulb of the thermal expansion valve. The controller may be coupled and/or already be coupled to the heat transfer elements. In some implementations, the controller may be mounted on the air conditioner and/or a portion thereof. In some implementations, the air conditioner may include a controller that is alterable by a software update. The software update may allow control of the heat transfer element in addition to one or more other components of the air conditioner. The controller may be coupled to the heat transfer element (e.g., using wires). During use, the controller and heat transfer elements may act to alter the automatic operations of the thermal expansion valve.

The sensors of the retrofit kit may be coupled to portions of the system for monitoring (e.g., proximate a condenser and/or condenser blower, in a refrigerant line or portions thereof, and/or in or proximate to a component of the system). When a monitored property of the system is determined to exceed a predetermined maximum value and/or be outside a predetermined range, the control system may transmit the signal to alter the automatic control provided by the valve controller (e.g., thermal expansion valve).

In some implementations, the control system may be coupled to the air conditioner prior to installation of the air conditioner at a location. The controller of the control system may be a portion of and/or the operations of the controller of the control system may be performed by the controller of the air conditioner.

In some implementations, an operation of the thermal expansion valve may be monitored. The operation may be related to a health of the thermal expansion valve. For example, a responsiveness (e.g., a degree of openness, spring tension, and/or amount of fluid allowed to pass though the valve) to the alteration of the operation of the thermal expansion valve by the control system may be monitored. If a response is not within an expected predetermined range (e.g., a predetermined tolerance range), then a valve health problem may be indicated. A warning may be issued by the control system. In some implementations, the controller of the control system may deliver a second signal based at least partially on the responsiveness. For example, if a valve is sticking and not opening as large as expected in response to a signal from the controller, then the controller may generate a second signal based on the responsiveness. The second signal may be designed to obtain the degree of openness desired by the first signal but not obtained due to the valve sticking.

In some implementations, an air conditioner may include a two-stage or multistage compressor. Rather than selecting a single operating range for the thermal expansion valve to automatically adjust within, the controller may alter the temperature of the bulb to operate more efficiently at the stage at which the compressor is operating. For example, a predetermined event may include operation of a two-stage or multi-stage compressor at a selected stage. The controller may determine that the compressor is operating at the selected stage, and thus that a predetermined event has occurred, and transmit a signal based on the predetermined event. The fluid flow through the valve may then be altered based on the selected stage of the compressor.

In some implementations, an air conditioner may be charged incorrectly (e.g., the amount of refrigerant provided to the system may not be within a predetermined operating range). The incorrect charging may be a predetermined event detected by the control system. The control system may deliver a signal to the heat transfer elements based on the predetermined event. For example, an air conditioner may not be charged with enough refrigerant (e.g., less refrigerant than the predetermined operating range). The control system may transfer a signal to allow the heat transfer element to deliver heat to the bulb of the thermal expansion valve and thus increase the openness of the thermal expansion valve. The increased refrigerant allowed to pass through the thermal expansion valve may decrease stress on the system and/or may inhibit mechanical failure of the system.

In some implementations, the control system may be utilized with other control processes, such as processes that may be utilized during high ambient temperatures, slugging incidents, high pressure events, and/or repeat trips (e.g., pressure) of a system. Various control processes are described in U.S. patent application Ser. No. 13/600,763 entitled "CONTROLLING AIR CONDITIONERS" to Perez et al., filed on Aug. 31, 2012, and incorporated by reference herein.

Although high-pressure events have been described, the various systems and/or processes may be utilized with predetermined events, such as low-pressure events. Although altering the automatic adjustment of the valve has been described in various systems and/or processes as increasing the amount of fluid allowed to flow through the valve, the alteration may include decreasing the amount of fluid allowed to flow through the valve.

Although a system utilizing a bulb at least partially filled with refrigerant has been described, other temperature and/or pressure sensitive devices may be utilized. Although a capillary tube has been specifically described, other conduits may be utilized to couple the bulb and the diaphragm.

Although the heat transfer elements have been described in various systems and/or processes as heating the bulb, the heat transfer elements may cool the bulb and/or remove heat from the bulb.

Although thermal expansion valves have been described, other types of metering devices may be used in one or more of the systems and/or processes described. For example, other types of metering devices with temperature and/or pressure sensitive bulbs may be utilized.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a predetermined event" includes a combination of two or more predetermined events and reference to "fan" includes different types and/or combinations of fans. Reference to "a compressor" may include a combination of two or more compressors. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An air conditioner comprising:
   a thermal expansion valve configured to automatically adjust an amount of refrigerant allowed to pass through the valve, wherein the thermal expansion valve comprises:
      a bulb containing a fluid, wherein a temperature of the bulb at least partially controls the amount of refrigerant allowed to pass through the thermal expansion valve;
      a diaphragm, wherein the diaphragm is fluidly coupled with the bulb and operable to respond to the temperature of the bulb to at least partially control the amount of refrigerant allowed to pass through the thermal expansion valve; and
   a control system coupled to the thermal expansion valve, the control system comprising:
      one or more heat transfer elements coupled to the bulb and configured to increase and decrease the temperature of the bulb; and
      a controller coupled to the one or more heat transfer elements, wherein the controller is configured to deliver a signal controlling heat transfer by one or more of the heat transfer elements;
   wherein the control system is configured to:
      alter the automatic adjustment of the thermal expansion valve by delivering the signal controlling heat transfer by one or more of the heat transfer elements in response to determining a pressure in a portion of the air conditioner exceeds a predetermined maximum pressure;

monitor a responsiveness of the thermal expansion valve to the delivered signal;

determine that the responsiveness of the thermal expansion valve is outside a predetermined tolerance range;

deliver an additional signal to at least one of the heat transfer elements in respose to determining that the responsiveness of the thermal expansive valve is outside the predetermined tolerance range; and further after the amount of refrigerant allowed to pass through the thermal expansion valve in conjunction with delivering the additional signal; and wherein the controller is configured to alter the ordinary operation of the thermal expansion valve to reduce an effect of conditions of the air conditioner that increase sensitivity of the thermal expansion valve due to the pressure exceeding the predetermined maximum pressure.

2. The air conditioner of claim 1 wherein altering the ordinary operation of the thermal expansion valve comprises altering the openness of a valve in response to system properties detected by the bulb of the thermal expansion valve.

3. The air conditioner of claim 1 wherein the controller is configured to alter the ordinary operation of the thermal expansion valve in response to a condition of the air conditioner.

4. The air conditioner of claim 3 wherein the condition of the air conditioner comprises a high ambient temperature or a low pressure in a portion of the air conditioner.

5. The air conditioner of claim 3 wherein the condition of the air conditioner comprises a high pressure in an evaporator due to charging.

6. The air conditioner of claim 1 wherein:

the responsiveness of the thermal expansion valve corresponds to a degree of openness of the thermal expansion valve; and the control system is further configured to:

detect a valve problem when the degree of openness is less than a predetermined degree of openness associated with the signal delivered to alter the automatic adjustment of the thermal expansion valve; and in response to detecting the valve problem, deliver a second signal to at least one of the heat transfer elements, the second signal configured to achieve the expected predetermined degree of openness associated with the signal delivered to alter the automatic adjustment of the thermal expansion valve.

* * * * *